(12) United States Patent
Hartsuiker et al.

(10) Patent No.: US 7,759,874 B2
(45) Date of Patent: Jul. 20, 2010

(54) APPARATUS FOR EFFECTING PLASMA CHEMICAL VAPOR DEPOSITION (PCVD)

(75) Inventors: Johannes Antoon Hartsuiker, Eindhoven (NL); Marco Korsten, Eindhoven (NL); Mattheus Jacobus Nicolaas Van Stralen, Tilburg (NL); Rob Hubertus Matheus Deckers, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 509 days.

(21) Appl. No.: 11/762,959

(22) Filed: Jun. 14, 2007

(65) Prior Publication Data
US 2007/0289532 A1 Dec. 20, 2007

(30) Foreign Application Priority Data
Jun. 16, 2006 (NL) .................................... 1032015

(51) Int. Cl.
*H05B 31/26* (2006.01)
(52) U.S. Cl. .............................. 315/111.21; 315/111.41; 118/723 MW
(58) Field of Classification Search ......... 118/723 MW, 118/723 I, 720, 725; 427/163.2, 238, 294, 427/575; 315/111.21, 111.41
See application file for complete search history.

(56) References Cited

U.S. PATENT DOCUMENTS

| | | | | |
|---|---|---|---|---|
| 5,223,308 A | | 6/1993 | Doehler | |
| 5,230,740 A | * | 7/1993 | Pinneo | 118/723 MW |
| 5,361,016 A | * | 11/1994 | Ohkawa et al. | 315/111.41 |
| 5,449,412 A | * | 9/1995 | Pinneo | 118/723 MP |
| 6,161,498 A | * | 12/2000 | Toraguchi et al. | 118/723 MW |
| 6,260,510 B1 | * | 7/2001 | Breuls et al. | 118/723 MW |
| 6,715,441 B2 | * | 4/2004 | Breuls et al. | 118/723 MW |
| 6,849,307 B2 | | 2/2005 | Breuls et al. | |
| 2003/0104139 A1 | | 6/2003 | House et al. | |
| 2003/0115909 A1 | | 6/2003 | House et al. | |
| 2004/0182320 A1 | | 9/2004 | Breuls et al. | |
| 2007/0289532 A1 | | 12/2007 | Hartsuiker et al. | |

FOREIGN PATENT DOCUMENTS

EP 1867610 A1 12/2007

OTHER PUBLICATIONS

European Search Report and Written Opinion in corresponding European Application No. 07011198, dated Oct. 8, 2007.
Dutch Search Report for corresponding Dutch Application No. 1032015, mailed on Mar. 5, 2007.

* cited by examiner

*Primary Examiner*—Douglas W Owens
*Assistant Examiner*—Tung X Le
(74) *Attorney, Agent, or Firm*—Summa, Addition & Ashe, P.A.

(57) ABSTRACT

The present invention relates to an apparatus for carrying out a plasma chemical vapor deposition process by which one or more layers of doped or undoped silica can be deposited on the interior of an elongated glass substrate tube. The present invention further relates to a method for manufacturing an optical fiber using such an apparatus.

22 Claims, 1 Drawing Sheet

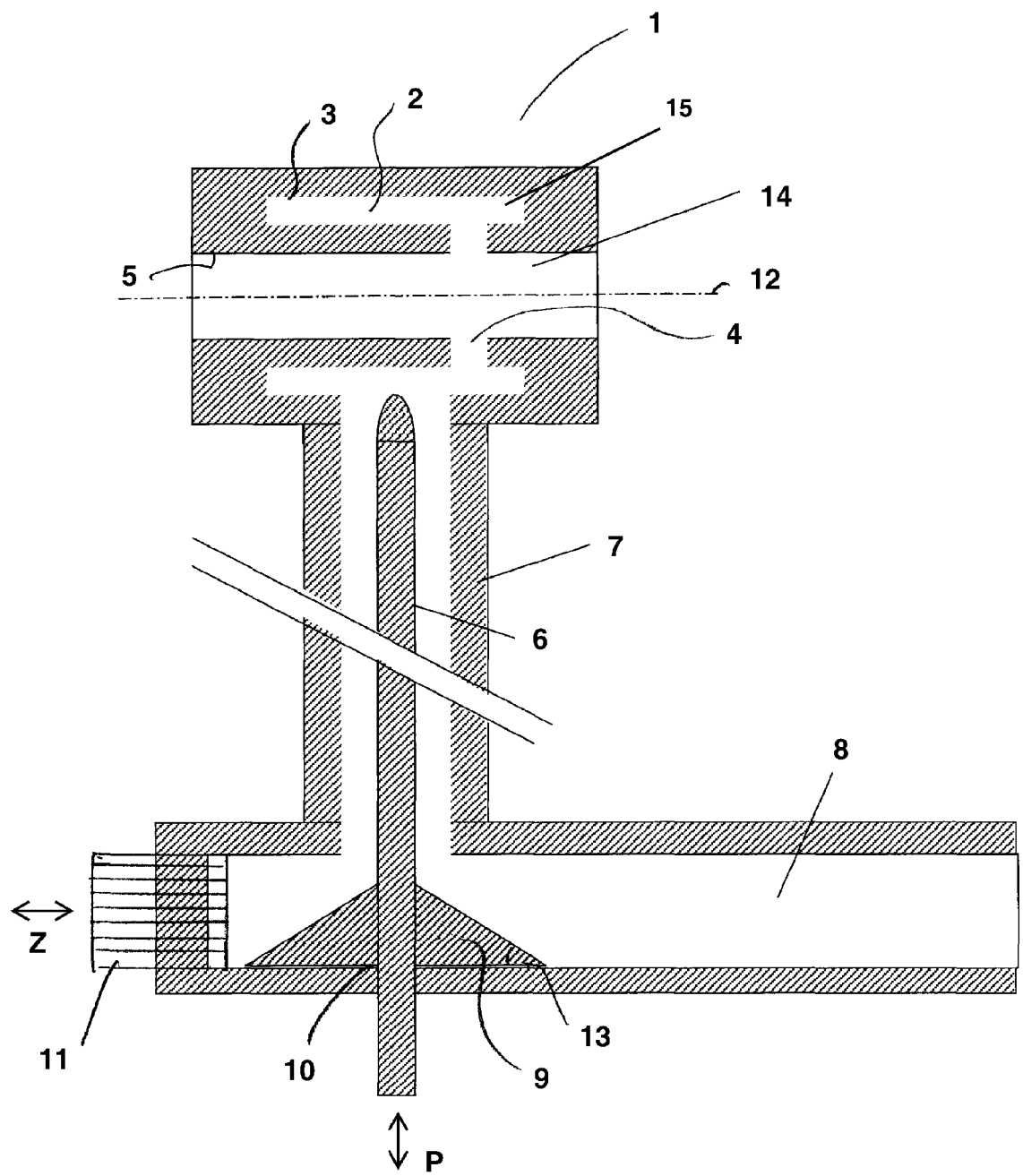

APPARATUS FOR EFFECTING PLASMA CHEMICAL VAPOR DEPOSITION (PCVD)

CROSS-REFERENCE TO PRIORITY APPLICATION

This application hereby claims the benefit of pending Dutch Application No. 1032015 (filed Jun. 16, 2006, at the Dutch Patent Office), which is hereby incorporated by reference in its entirety.

FIELD OF THE INVENTION

The present invention relates to an improved apparatus for performing plasma chemical vapor deposition (PCVD) by which one or more layers of doped or undoped silica can be deposited on the interior of an elongated glass substrate tube. The present invention further relates to methods of making an optical fiber using this apparatus.

BACKGROUND OF THE INVENTION

Microwave-enhanced chemical vapor deposition techniques are known in the art.

For instance, U.S. Pat. No. 5,223,308 (Doehler) relates to a microwave-assisted deposition apparatus that comprises a microwave generator and a rectangular microwave waveguide that are employed to provide an electromagnetic field of intense microwave energy in a space in which an elongated hollow tube is continuously moved. The disclosed apparatus applies a coating of silicon oxide, silicon nitride, or silicon oxycarbide to the elongated hollow tube. The elongated tube, which is formed of a synthetic resin (e.g., a nylon material), is used in automobiles as piping for hydraulic air conditioning systems in order to minimize the loss into the atmosphere of liquid coolant (e.g., Freon).

U.S. Patent Publication No. 2003/0104139 (House et al.) relates to an apparatus for depositing a plasma chemical vapor deposition (PCVD) coating on the interior of a hollow glass tube. The applicator comprises a waveguide that guides microwaves from a microwave generator to an applicator head. The waveguide has an elongated axis and, perpendicular to this elongated waveguide axis, a rectangular cross-section having a long axis and a short axis. A glass tube is positioned within the applicator head, and the applicator head is moved over the hollow glass tube along the longitudinal axis of the tube.

U.S. Patent Publication No. 2003/0115909 (House et al.) relates to an apparatus for depositing one or more glass layers on the interior of a hollow substrate tube. An activator space of a microwave applicator surrounds the hollow substrate tube. Microwaves generating plasma in the interior of the hollow substrate tube cause the glass-forming precursors to deposit silicon dioxide ($SiO_2$) onto the interior of the substrate tube.

U.S. Pat. No. 6,849,307 (Breuls et al.) relates to an apparatus for manufacturing an optical fiber from a preform. An elongated vitreous substrate tube (e.g., including quartz) is coated on its interior cylindrical surface with layers of doped silica (e.g., germanium-doped silica). This can be achieved by positioning the substrate tube along the cylindrical axis of the resonant cavity and flushing the interior of the tube with a gaseous mixture that includes, for example, oxygen ($O_2$), silicon tetrachloride ($SiCl_4$), and germanium dichloride ($GeCl_2$). A localized plasma is concurrently generated within the cavity, causing the reaction of silicon, oxygen, and germanium so as to effect direct deposition of germanium-doped silica ($SiO_x$) on the interior surface of the substrate tube. As the deposition occurs only in the vicinity of the localized plasma, the resonant cavity (and thus the plasma) must be swept along the cylindrical axis of the substrate tube in order to uniformly coat its entire length. When coating is complete, the substrate tube is thermally collapsed into a rod having a germanium-doped silica core portion and a surrounding undoped silica cladding portion.

Thereafter, if an extremity of the rod is heated so that it becomes molten, a thin glass fiber can be drawn from the rod and wound on a reel. The glass fiber possesses a core portion and a cladding portion that corresponds to those of the rod. Because the germanium-doped core has a higher refractive index than the undoped cladding, the glass fiber can function as a waveguide for optical signals (e.g., propagating optical telecommunication signals). With respect to U.S. Pat. No. 6,849,307, the gaseous mixture flushed through the substrate tube may contain other components. The addition of hexafluoroethane ($C_2F_6$), for instance, reduces the refractive index of the doped silica.

Furthermore, the solid preform may be placed in a so-called jacket tube (e.g., including undoped silica) before drawing to increase the quantity of undoped silica relative to doped silica in the resulting glass fiber. Additional silica may also be applied via a plasma process or outside vapor deposition (OVD) process.

U.S. Pat. No. 6,849,307 is hereby incorporated by reference in its entirety.

The use of an optical fiber for telecommunication purposes requires that the optical fiber is substantially free from defects (e.g., discrepancies in the dopants concentration or undesirable cross-sectional ellipticity). Over great lengths of the optical fiber, such defects may cause significant signal attenuation.

The PCVD process must be uniform and reproducible because the quality of the deposited PCVD layers determines the quality of the optical fibers. In particular, the plasma generated in the resonant cavity should be rotationally symmetrical (i.e., around the cylindrical axis of the resonant cavity).

On the other hand, production costs would be reduced if a suitable large-diameter preform could be employed (i.e., more fiber lengths might then be obtained from a single preform). Unfortunately, increasing the resonant cavity's diameter to accommodate a thicker preform will cause the rotational symmetry of the plasma to deteriorate. Moreover, to generate a plasma sufficient for a large-diameter preform would require much higher microwave power.

In the PCVD apparatus disclosed in U.S. Pat. No. 6,849, 307, energy from a source capable of generating microwaves (e.g., a klystron) is transferred to an annular resonant cavity so as to form a plasma zone in the interior of the substrate tube. In particular, microwaves are transferred from the microwave source to the annular resonant cavity via an elongated microwave guide. The microwave guide has a central longitudinal axis that is substantially perpendicular to the cylindrical axis of the annular resonant cavity.

In this kind of PCVD apparatus, an antenna present within the microwave guide is centered using one or more centering components. Such centering components, which are likewise positioned within the microwave guide, encounter and thus must be permeable to microwaves. The centering components enable the antenna to move along the longitudinal axis in the microwave guide and furthermore ensure that the antenna cannot touch the wall of the microwave guide.

The present inventors have found that centering component materials are susceptible to undesirable sparking. Moreover, such materials reduce the maximum microwave power supplied to the resonant cavity, which is attributable to their relatively low dielectric strength. In addition, the present inventors have found that the surface roughness of such centering component materials introduces minor air channels, which adversely affect the performance of the resonant cavity.

The present inventors have further established that if sparking occurs, the mechanical loads to which such materials are subjected are so heavy that cracking or even evaporation may ensue, causing damage to the resonant cavity and requiring eventual replacement of the resonant cavity.

It is desirable, of course, to achieve high rates of deposition of glass layers on the interior of the substrate tube. This requires high microwave power. Consequently, such centering components constitute an undesirable constraint for PCVD devices.

SUMMARY OF THE INVENTION

Accordingly, one aspect of the present invention is to provide an apparatus for carrying out a plasma chemical vapor deposition (PCVD) process in which the apparatus is capable of employing high microwave power levels to yield high deposition rates.

Another aspect of the present invention is to provide an apparatus for carrying out a plasma chemical vapor deposition (PCVD) process in which the transfer of energy from microwaves to the plasma in the waveguide is improved, if not optimized.

Yet another aspect of the present invention is to provide an apparatus for carrying out a plasma chemical vapor deposition (PCVD) process that reduces the undesirable reflection of microwaves during the passage of microwaves from a feed waveguide to a coaxial waveguide.

An exemplary apparatus according to the present invention includes a resonant cavity and a microwave guide, which itself includes a feed waveguide and an elongated coaxial waveguide. The coaxial waveguide projects into the resonant cavity, which is formed substantially cylindrically and symmetrically around a cylindrical axis. In performing plasma chemical vapor deposition, a glass substrate tube can be positioned within the resonant cavity along its cylindrical axis.

The resonant cavity is substantially annular in shape, possessing an inner cylindrical wall and an outer cylindrical wall. The inner cylindrical wall includes a slit that extends around (i.e., at least partially encircles) the resonant cavity's cylindrical axis. The slit may be continuous or include interruptions.

The coaxial waveguide has a longitudinal axis that extends substantially perpendicular to the resonant cavity's cylindrical axis. An antenna positioned within the coaxial waveguide is movable along the coaxial waveguide's longitudinal axis. A feed waveguide (and the additional axis it defines) is disposed at an angle (i.e., non-linearly) to the coaxial waveguide (and its longitudinal axis), typically from about 90° to 180°. In an exemplary embodiment, for instance, the coaxial waveguide may be arranged substantially perpendicular to the feed waveguide.

According to the present invention, the apparatus for carrying out a plasma chemical vapor deposition (PCVD) process typically employs an antenna that bisects the feed waveguide. When such a particular construction of the antenna in the coaxial waveguide is used, it is possible to omit the centering components from the coaxial waveguide. Because the antenna bisects the feed waveguide (and is partially located outside the microwave guide), centering of the antenna in the coaxial waveguide can be readily achieved.

Moreover, the configuration (i.e., construction) of the present PCVD apparatus simplifies cleaning of the resonant cavity if and when sparking occurs. This facilitates reuse of the resonant cavity, which, in turn, leads to considerable cost savings. Moreover, because the antenna bisects the feed waveguide and is partially located outside the feed waveguide, it is possible to cool the antenna using forced gas or liquid cooling. Such cooling may be necessary when high microwave power levels are employed. Furthermore, it has now been found that the configuration of the present PCVD apparatus makes maintaining the antenna at the central position in the coaxial waveguide less important to the proper operation of the PCVD apparatus.

In a particular embodiment of the present PCVD apparatus, a guide element is present in the interior of the feed waveguide at the point where the antenna bisects the feed waveguide. The guide element enables the microwaves to pass from the feed waveguide to the coaxial waveguide (i.e., facilitates passage of the microwaves into the coaxial waveguide). The guide element must be configured so that passage of microwaves from the feed portion to the coaxial portion of the waveguide will not cause reflection of microwaves, which adversely affects the microwave power supplied to the plasma zone. In this regard, the guide element typically embraces a conical or spherical shape.

The guide element is located in the feed waveguide such that its bottom surface abuts the inner wall of the feed waveguide. As used herein, the phrase "bottom surface of the guide element" should be understood to mean that part of the guide element that makes contact with the inner wall of the feed waveguide (e.g., the base of the cone in the case of a conical guide element). Preferably, the antenna is capable of moving longitudinally (i.e., longitudinally movable) through the apex of the conical or spherical guide element (i.e., the conical or spherical guide element is symmetrically bisected by the antenna).

To further improve the transition from rectangular waveguide to coaxial waveguide, a tuning element may be present in the feed waveguide. The tuning element is movable along the longitudinal axis of the feed waveguide and typically extends over the entire cross-section of the feed waveguide.

Moreover, in a particular embodiment, one or more slits are provided in the internal cylindrical wall of the resonant cavity.

The present invention further relates to a method for manufacturing an optical fiber via a plasma chemical vapor deposition process. In this regard, the method includes steps of (i) carrying out a plasma chemical vapor deposition process for depositing one or more doped or undoped layers of silica on the interior surface of an elongated glass substrate tube (ii) subjecting the substrate tube to a thermal contraction treatment so as to form a solid preform; and (iii) melting one extremity of the solid preform and drawing an optical fiber therefrom.

In a particular embodiment of the present method, the antenna is typically moved along the longitudinal axis of the coaxial waveguide during the plasma chemical vapor deposition process in order to optimize the passage of the microwaves from the feed waveguide to the coaxial waveguide.

Typically, the tuning element present in the feed waveguide is moved along the longitudinal axis of the feed waveguide during the plasma chemical vapor deposition process in order to optimize the transfer of energy to the plasma zone.

The foregoing, as well as other objectives and advantages of the invention and the manner in which the same are accomplished, is further specified within the following detailed description and its accompanying figures.

BRIEF DESCRIPTION OF THE DRAWING

The FIGURE schematically depicts a cross-sectional view of the PCVD apparatus according to the present invention.

DETAILED DESCRIPTION

The present invention will now be explained in more detail with reference to the , which depicts an exemplary embodiment of the present invention. As will be appreciated by those having ordinary skill in the art, this FIGURE is a schematic representation, which is not necessarily drawn to scale. This invention may be embodied in many different forms and should not be construed as limited to the embodiments set forth herein. The embodiments disclosed are provided to convey the scope of the invention to those having skill in the relevant art.

In the FIGURE, the apparatus for carrying out a plasma chemical vapor deposition (PCVD) process is schematically indicated at 1. The apparatus 1 includes an internal guide or antenna 6, which is at least partially positioned in a coaxial waveguide 7. The antenna 6 is movable along a longitudinal axis in the coaxial waveguide 7 (i.e., in the direction indicated by the arrow P). The antenna 6 terminates in a resonant cavity 2.

A resonant cavity 2, which is substantially annular in shape, has an outer cylindrical wall 3 and an inner cylindrical wall 5, which defines a slit 4. The slit 4 fully extends around the cylindrical axis 12 of the resonant cavity 2 (i.e., in a plane perpendicular to the cross-sectional plane depicted in the figure). Accordingly, the inner cylindrical wall 5 defines an inner central cavity 14 and the inner cylindrical wall 5 and the outer cylindrical wall 3 together define an outer annular cavity 15. As depicted in the FIGURE, resonant cavity 2 includes inner central cavity 14 and outer annular cavity 15.

The antenna 6 has a (central) longitudinal axis, which extends substantially perpendicularly to the cylindrical axis 12 of the resonant cavity 2. The longitudinal axis of the antenna 6 is staggered (i.e., offset) from the slit 4 that, as noted, is formed in the inner cylindrical wall 5 of the resonant cavity 2.

Those having ordinary skill in the art will appreciate that because deposition of glass layers occurs within the resonant cavity 2 only in the vicinity of the plasma zone, the resonant cavity 2 (and thus the plasma zone) must be moved along its cylindrical axis 12 so as to coat the glass substrate tube (not shown) uniformly along its entire length.

The feed waveguide 8 is connected to a microwave source, such as a klystron or a magnetron (not shown), that supplies microwaves to the feed waveguide 8. (Such sources of microwave radiation are known to those having ordinary skill in the art.) The microwaves propagate into the coaxial waveguide 7 and then to the resonant cavity 2. Within the resonant cavity 2, a plasma zone is generated in a glass substrate tube (not shown) that is positioned within the inner central cavity 14. The plasma zone creates conditions such that glass-forming precursors being supplied to the interior of the glass substrate tube will deposit on the inner wall of the glass substrate tube, thereby forming one or more glass layers.

As depicted in the FIGURE, the antenna 6 bisects the feed waveguide 8 near the bisection point 10 and may be present outside the feed waveguide 8. This apparatus design makes it possible to leave out conventional centering components, which otherwise are located within the coaxial waveguide 7.

To improve the passage of microwaves from the feed waveguide 8 to the coaxial waveguide 7, a guide element 9 is provided. The guide element 9 has a bottom surface 13 that abuts the inner wall of the feed waveguide 8.

To realize a further optimization of the microwave power, a tuning element 11 is provided in the feed waveguide 8. The tuning element 11 is movable along the longitudinal axis of the feed waveguide 8 in the direction indicated by the arrow Z.

Typically, the feed waveguide 8 is connected to the coaxial waveguide 7 in such a manner that the antenna 6, which is movable in the coaxial waveguide 7, does not cross the feed waveguide 8 in its center. In other words and as depicted in the FIGURE, the part of the feed waveguide 8 in which the tuning element 11 is present (i.e., to the left of the guide element) is shorter in length than the part of the feed waveguide 8 in which no tuning element 11 is present (i.e., to the right of the guide element).

In the specification and FIGURE, typical embodiments of the invention have been disclosed. Unless otherwise noted, specific terms have been used in a generic and descriptive sense and not for purposes of limitation.

The invention claimed is:

1. An apparatus for carrying out a plasma chemical vapor deposition process by which one or more layers of doped or undoped silica can be deposited on the interior of an elongated glass substrate tube, the apparatus comprising:
    an elongated microwave waveguide that projects into a substantially annular resonant cavity that is formed substantially cylindrically symmetrically around a cylindrical axis;
    wherein said resonant cavity comprises an inner cylindrical wall and an outer cylindrical wall, said inner cylindrical wall defining a slit that extends in a full circle around said cylindrical axis of said resonant cavity;
    wherein said microwave guide has (i) a longitudinal axis that extends substantially perpendicularly to said cylindrical axis of said resonant cavity so as to form a coaxial waveguide and (ii) a supplemental axis that extends at an angle relative to said longitudinal axis so as to form a feed waveguide; and
    wherein an antenna within said coaxial waveguide is movable along said longitudinal axis of said microwave guide to bisect said feed waveguide.

2. An apparatus according to claim 1, further comprising a guide element that is present in the interior of said feed waveguide at the point where said antenna bisects said feed waveguide, wherein said guide element facilitates passage of microwaves from said feed waveguide to said coaxial waveguide.

3. An apparatus according to claim 2, wherein said guide element has a conical shape or a spherical shape and wherein the bottom surface of said guide element abuts the inner wall of said feed waveguide.

4. An apparatus according to claim 3, wherein said antenna is movable through the apex of said guide element, said antenna symmetrically bisecting said guide element.

5. An apparatus according to claim 1, further comprising a tuning element that is present in said feed waveguide, wherein said tuning element (i) is movable along said supplemental axis of said microwave guide and (ii) extends over the entire cross-section of said feed waveguide.

6. An apparatus according to claim 1, wherein said inner cylindrical wall of said resonant cavity defines a slit having interruptions.

7. An apparatus according to claim 1, wherein said feed waveguide is arranged at an angle substantially perpendicular to said longitudinal axis of said microwave guide.

8. An apparatus according to claim 1, wherein said longitudinal axis of said microwave guide is offset from said slit defined in said inner cylindrical wall of said resonant cavity.

9. An apparatus according to claim 1, wherein an elongated glass substrate tube is coaxially positioned along said cylindrical axis of said resonant cavity.

10. A method for manufacturing an optical fiber via a plasma chemical vapor deposition process using the apparatus according to claim 1, comprising the following steps:
carrying out a plasma chemical vapor deposition process for depositing one or more doped or undoped layers of silica on the interior surface of an elongated glass substrate tube;
subjecting the glass substrate tube to a thermal contraction treatment so as to form a solid preform; and
melting one extremity of the solid preform and drawing an optical fiber therefrom;
wherein the glass substrate tube is placed along the cylindrical axis and within the inner cylindrical wall of the resonant cavity such that the glass substrate tube and the resonant cavity are substantially coaxial; and
wherein the resonant cavity is moved reciprocatingly along the length of the glass substrate tube to effect the deposition of one or more doped or undoped layers of silica on the interior of the substrate tube.

11. A method according to claim 10, further comprising the step of moving the antenna along the longitudinal axis of the microwave guide to optimize the passage of the microwaves from the feed waveguide to the coaxial waveguide during the plasma chemical vapor deposition process.

12. An apparatus for effecting plasma chemical vapor deposition onto the interior surface of a glass substrate tube, the apparatus comprising:
a substantially cylindrical resonant cavity comprising an inner cylindrical wall and an outer cylindrical wall, wherein said inner cylindrical wall defines an inner central cavity, wherein said inner cylindrical wall and said outer cylindrical wall together define an outer annular cavity, and wherein said inner cylindrical wall further defines a circumferential slit that at least partially encircles said inner cylindrical wall to provide a microwave passage between said outer annular cavity and said inner central cavity;
a microwave guide in microwave communication with said resonant cavity, said microwave guide comprising a coaxial waveguide and a feed waveguide, wherein said feed waveguide propagates microwaves from a source of microwave radiation to said coaxial waveguide and wherein said coaxial waveguide projects into said outer annular cavity of said resonant cavity to thereby propagate microwaves from said feed waveguide to said resonant cavity; and
an antenna at least partially positioned within and movable along the length of said coaxial waveguide to intersect said feed waveguide.

13. A PCVD apparatus according to claim 12, wherein:
said resonant cavity defines a cylindrical axis; and
said coaxial waveguide defines a longitudinal axis, said longitudinal axis of said coaxial waveguide extending substantially perpendicularly to said cylindrical axis of said resonant cavity.

14. A PCVD apparatus according to claim 13, wherein said longitudinal axis of said coaxial waveguide is offset from said circumferential slit that is formed in said inner cylindrical wall of said resonant cavity.

15. A PCVD apparatus according to claim 12, wherein:
said coaxial waveguide defines a first axis for said microwave guide;
said feed waveguide defines a second axis for said microwave guide; and
said microwave guide's first axis and said microwave guide's second axis define an angle from about 90° or more to less than 180°.

16. A PCVD apparatus according to claim 15, further comprising a guide element to facilitate propagation of microwaves from said feed waveguide to said coaxial waveguide, said guide element positioned within said feed waveguide so as to be bisected by said antenna.

17. A PCVD apparatus according to claim 16, wherein:
said guide element is a substantially conical or a substantially spherical guide element, said guide element having a bottom surface that substantially abuts the inner wall of said feed waveguide; and
said antenna symmetrically bisects and is movable through said guide element.

18. A PCVD apparatus according to claim 15, further comprising a tuning element positioned within said feed waveguide, wherein said tuning element (i) extends over the entire cross-section of said feed waveguide and (ii) is movable within said feed waveguide along said second axis for said microwave guide.

19. A PCVD apparatus according to claim 12, wherein said antenna is maintained within said coaxial waveguide without employing centering components that are located in said coaxial waveguide.

20. A PCVD apparatus according to claim 12, wherein said antenna is partially located outside of said microwave guide.

21. An apparatus for effecting plasma chemical vapor deposition, the apparatus comprising:
a substantially cylindrical resonant cavity defining a cylindrical axis, said resonant cavity comprising an inner cylindrical wall and an outer cylindrical wall, wherein said inner cylindrical wall defines an inner central cavity, wherein said inner cylindrical wall and said outer cylindrical wall together define an outer annular cavity, and wherein said inner cylindrical wall further defines a circumferential slit that at least partially encircles said inner cylindrical wall to permit microwave energy to pass between the outer annular cavity and said inner central cavity;
a microwave guide in microwave communication with said resonant cavity, said microwave guide comprising a coaxial waveguide and a feed waveguide, said coaxial waveguide defining a first axis for said microwave guide and said feed waveguide defining a second axis for said microwave guide, wherein said feed waveguide propagates microwaves from a microwave source to said coaxial waveguide and wherein said coaxial waveguide propagates microwaves from said feed waveguide to said resonant cavity;
a tuning element positioned within said feed waveguide, wherein said tuning element (i) extends over the entire cross-section of said feed waveguide and (ii) is movable within said feed waveguide along said microwave guide's second axis;
a substantially conical or spherical guide element having a bottom surface that substantially abuts the inner wall of said feed waveguide, said guide element configured to facilitate the propagation of microwaves from said feed waveguide to said coaxial waveguide; and
an antenna partially positioned within said coaxial waveguide and partially located outside of said microwave guide, wherein said antenna bisects said feed waveguide and said guide element and wherein said antenna is movable both along the length of said coaxial waveguide and through said guide element; and wherein said microwave guide's first axis is substantially perpendicular to said cylindrical axis of said resonant cavity;

wherein said microwave guide's first axis is offset from said circumferential slit that is formed in said inner cylindrical wall of said resonant cavity; and wherein said microwave guide's first axis and said microwave guide's second axis define an angle of less than 180°.

22. An apparatus according to claim 21, wherein said antenna is centered within said coaxial waveguide by properly positioning a part of said antenna that is located outside of said microwave guide.

\* \* \* \* \*

UNITED STATES PATENT AND TRADEMARK OFFICE
CERTIFICATE OF CORRECTION

PATENT NO. : 7,759,874 B2  Page 1 of 1
APPLICATION NO. : 11/762959
DATED : July 20, 2010
INVENTOR(S) : Johannes Antoon Hartsuiker et al.

It is certified that error appears in the above-identified patent and that said Letters Patent is hereby corrected as shown below:

In the Title Page

Item (74) reads "Summa, ~~Addition~~ & Ashe, P.A."
and should read "Summa, Additon & Ashe, P.A."

In the Specification

Column 5, Line 12 reads "with reference to the , which depicts an exemplary embodi-"
and should read "with reference to the figure, which depicts an exemplary embodi-"

Signed and Sealed this
Fifteenth Day of February, 2011

David J. Kappos
*Director of the United States Patent and Trademark Office*